United States Patent
Choi et al.

(10) Patent No.: US 9,151,993 B2
(45) Date of Patent: Oct. 6, 2015

(54) LIQUID CRYSTAL DISPLAY DEVICE AND FABRICATION METHOD THEREOF

(71) Applicant: LG DISPLAY CO., LTD., Seoul (KR)

(72) Inventors: SuSeok Choi, Seongnam-si (KR); SangHo Choi, Gnpo-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/097,706

(22) Filed: Dec. 5, 2013

(65) Prior Publication Data
US 2014/0094080 A1 Apr. 3, 2014

Related U.S. Application Data

(62) Division of application No. 11/320,388, filed on Dec. 27, 2005, now Pat. No. 8,629,967.

(30) Foreign Application Priority Data

Dec. 30, 2004 (KR) .................. 1172442004
Dec. 30, 2004 (KR) .................. 1172462004

(51) Int. Cl.
G02F 1/1335 (2006.01)
G02F 1/1339 (2006.01)
G02F 1/1333 (2006.01)

(52) U.S. Cl.
CPC ...... G02F 1/13394 (2013.01); G02F 1/133377 (2013.01); G02F 1/133516 (2013.01); G02F 2202/023 (2013.01)

(58) Field of Classification Search
CPC .................. G02F 1/133514; G02F 1/133377; G02F 1/133516; G02F 2202/023
See application file for complete search history.

(56) References Cited

U.S. PATENT DOCUMENTS

| | | | |
|---|---|---|---|
| 5,374,373 A | 12/1994 | Koden et al. | |
| 6,097,467 A | 8/2000 | Fujimaki et al. | |
| 6,124,907 A | 9/2000 | Jones et al. | |
| 6,281,960 B1 | 8/2001 | Kishimoto et al. | |
| 6,469,683 B1 | 10/2002 | Suyama et al. | |
| 2002/0047959 A1* | 4/2002 | Matsumoto et al. .......... 349/106 |
| 2003/0038912 A1 | 2/2003 | Broer et al. | |

(Continued)

FOREIGN PATENT DOCUMENTS

| JP | 2002-116456 A | 4/2002 |
|---|---|---|
| JP | 2004133096 A | 4/2004 |

(Continued)

OTHER PUBLICATIONS

Office Action issued in corresponding Japanese Patent Application No. 2009-103318; issued Jul. 7, 2012.

(Continued)

*Primary Examiner* — Jessica M Merlin
(74) *Attorney, Agent, or Firm* — Brinks Gilson & Lione

(57) ABSTRACT

A LCD and a fabrication process is presented. An upper substrate is coincidentally formed with a red, a green and a blue color filters using phase separation. A compound containing a photopolymeric color filter resin and a liquid crystal are coated on an array substrate and then photopolymerized after formation of the array substrate. A seed layer may be provided on the substrate before the compound is applied. Polymerization of the color filter resin permits simultaneous formation of the upper, color filter substrate and liquid crystal layer.

15 Claims, 14 Drawing Sheets

(56) References Cited

U.S. PATENT DOCUMENTS

| | | | |
|---|---|---|---|
| 2003/0128311 A1* | 7/2003 | Tsuda et al. | 349/106 |
| 2003/0156236 A1 | 8/2003 | Yamada | |
| 2004/0252271 A1* | 12/2004 | Song | 349/155 |
| 2005/0036089 A1 | 2/2005 | Lyu | |
| 2006/0250568 A1* | 11/2006 | Penterman et al. | 349/183 |

FOREIGN PATENT DOCUMENTS

| | | |
|---|---|---|
| KR | 199000014922 A | 3/1994 |
| KR | 1019990010636 A | 2/1999 |
| KR | 20030063656 A | 7/2003 |
| WO | 02/42832 A2 | 5/2002 |

OTHER PUBLICATIONS

Office Action issued in corresponding Korean Patent Application No. 10-2004-0117246, mailed Mar. 11, 2011.

* cited by examiner

LIQUID CRYSTAL DISPLAY DEVICE AND FABRICATION METHOD THEREOF

CROSS REFERENCES TO RELATED APPLICATIONS

This application is a divisional of U.S. patent application Ser. No. 11/320,388, filed on Dec. 27, 2005, which claims priority to Korean Patent Application No. 117244/2004, filed on Dec. 30, 2004 and Korean Patent Application No. 117246/2004, filed on Dec. 30, 2004. The afore-mentioned patent applications are hereby incorporated by reference in their entireties.

TECHNICAL FIELD

The present invention relates to a liquid crystal display device (LCD), and more particularly, to a compact LCD of which a fabrication process is simplified, and the fabrication method thereof.

DESCRIPTION OF THE RELATED ART

In recent years, civilization has been rapidly advancing toward an information based society. This has created a demand for a flat panel display having properties such as thinness, decreased thickness, and low power consumption.

In general, since a liquid crystal display device (LCD) is a flat panel display that has improved visibility in comparison with a cathode ray tube (CRT) device. In addition, power consumption of the LCD is lower than that of the CRT for equal screen sizes. The LCD has been used as a next generation display device for mobile phones, computer monitors and televisions, in addition to other flat panel displays such as plasma display panels (PDP) and field emission displays (FED).

In the LCD, an electric field generation electrode is formed on each of two substrates and the surfaces of the substrate where the electrode are formed oppose each other. After a liquid crystal material is injected between two substrates, the LCD displays an image by controlling light transmissivity through the liquid crystal. The transmissivity varies with degree of rotation of liquid crystal molecules. The amount of rotation is dependent on an electric field generated by applying a voltage to the electrodes.

Generally, the liquid crystal molecules are anisotropic. The anisotropy of a liquid crystal cell or a film having those liquid crystal molecules is changed according to distributions of the liquid crystal molecules and distributions of tilt angels with respect to a substrate. Anisotropy is a factor for the polarization change of the light according to every viewing angle with respect to the cell or the film configured with the liquid crystal.

FIG. 1 is a schematic view illustrating a structure of a related art LCD. As shown in the drawing, the LCD includes a lower substrate 120 having a thin film transistor (TFT), an upper substrate 130 having a color filter 133, a liquid crystal film 140 filling a gap between the upper electrode 130 and the lower electrode 120, a first polarizer plate 129 under the lower substrate 120 for transmitting external light as linearly polarized light, and a second polarizer plate 139 over the upper substrate 130 having a transmission axis vertical to the first polarizer plate 129. The LCD also includes a back light unit 110 supplying light from a light source 111. The back light unit 110 is disposed under a liquid crystal panel provided with the lower substrate 120, the upper substrate 130 and the liquid crystal film 140.

In the lower substrate 120, a gate interconnection and a data interconnection are formed on a transparent substrate 121. The gate interconnection intersects the data interconnection. In addition, a TFT is provided with a gate electrode 122 extended from the gate interconnection, a gate insulating layer 123 formed on the gate electrode 122, a semiconductor layer 124 formed on the gate insulating layer 123, source/drain electrodes 125a and 125b formed on the semiconductor layer 124. A protection layer 126 is formed on the TFT. A pixel electrode 127 is connected to the drain electrode 125b of the TFT through a contact hole formed in the protection layer 126.

In the upper electrode 130, in order to inhibit light from being transmitted to a region other than that corresponding to the pixel electrode 127, a black matrix 132 is formed on a transparent substrate 131. Upon the black matrix 132, color patterns 133 of red, green and blue are formed for displaying various colors. A common electrode 134 is formed on the color filter patterns 133.

The first and the second polarizer plates 129 and 139 are formed on outer surfaces of each of the lower and the upper substrates 120 and 130 respectively. A transmission axis of the first polarizer plate 129 and that of the second polarizer plate are orthogonal. Incident light is polarized so that one component is transmitted and the other is absorbed or dispersed. That is, light is an electromagnetic wave having vibration direction is vertical to a propagation direction. The polarized light is biased toward the vibration direction. In other words, the polarized light is light that vibrates strongly in a predetermined direction among light vibrating in a plurality of directions perpendicular to the propagation direction.

Therefore, light emitted from the back light unit 110 disposed under the liquid crystal panel vibrates uniformly in all directions. The first and the second polarizer plates 129 and 139 transmit only light vibrating in the same direction to the polarization axis and they absorb or reflect light vibrating in the other directions by using a predetermined medium, to thereby make light vibrate in the predetermined direction.

Since the first and the second polarizer plates 129 and 139 are mounted on the lower and the upper substrates 120 and 130, respectively, in order that the polarization axis of the polarizer plates 129 and 139 are orthogonal, an intensity of the transmitted light is controlled according to a rotation degree of the polarization axis while passing through the liquid crystal layer 140 so that it is possible to display gray scale between black and white.

In the LCD having the above structure, each of the upper and the lower substrates 120 and 130 is fabricated through its own fabrication process. The upper and the lower substrates 120 and 130 are then bonded and liquid crystal injected therebetween to form the liquid crystal pane. Thus, since the upper and the lower substrates 120 and 130 are separately fabricated and bonded together, the fabrication time increases for the liquid crystal panel and its fabrication process becomes complicated. Accordingly, the production yield decreases and the fabrication cost increases in the long run.

In addition, polarized light transmitted by the first polarizer plate 129 mounted on the lower substrate 120 of the liquid crystal panel is converted into non-polarized light while passing through an interior of the liquid crystal panel. Scattering of the light occurs due to stepped portions formed in the lower substrate 120 and the color filters 133 formed in the upper electrode 130 so that the polarized light is converted into non-polarized light. Therefore, light transmissivity of the LCD is decreased because of the non-polarized light, which decreases the contrast ratio.

SUMMARY

By way of introduction only, in one embodiment an LCD comprises: a first substrate having a plurality of red, green and blue pixel regions; an array device disposed on the first substrate; a second substrate including red, green and blue polymers each integrated with a partition wall that extends towards the first substrate; and a liquid crystal film between the first and the second substrates.

In another embodiment, an LCD comprises: a first substrate having a plurality of pixel regions; an array device on the first substrate; a partition wall at a boundary of each of the pixel regions on the first substrate; a second substrate having a reactive mesogen integrated with the partition wall; and a liquid crystal film in the pixel region partitioned by the partition wall.

In another embodiment, a method for fabricating an LCD comprises: a) forming an array device on a lower substrate in each of red, green and blue color pixel regions; b) providing a compound containing a liquid crystal and a photopolymeric color polymer on the lower substrate; c) photo-exposing a boundary of a color filter region to form a partition wall from the photopolymeric color polymer; and d) photo-exposing the photopolymeric color polymer in the red, the green and the blue color pixel regions to form an upper substrate having a color polymer, the color polymer phase-separated from the liquid crystal.

In another embodiment, a method for fabricating an LCD comprises: a) forming an array device in a pixel region on a lower substrate; b) providing a polymer compound having a liquid crystal and a reactive mesogen on the lower substrate; c) forming a partition wall at a boundary of the pixel region; and d) forming an upper substrate that is phase separated from the liquid crystal by photo-exposing the lower substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
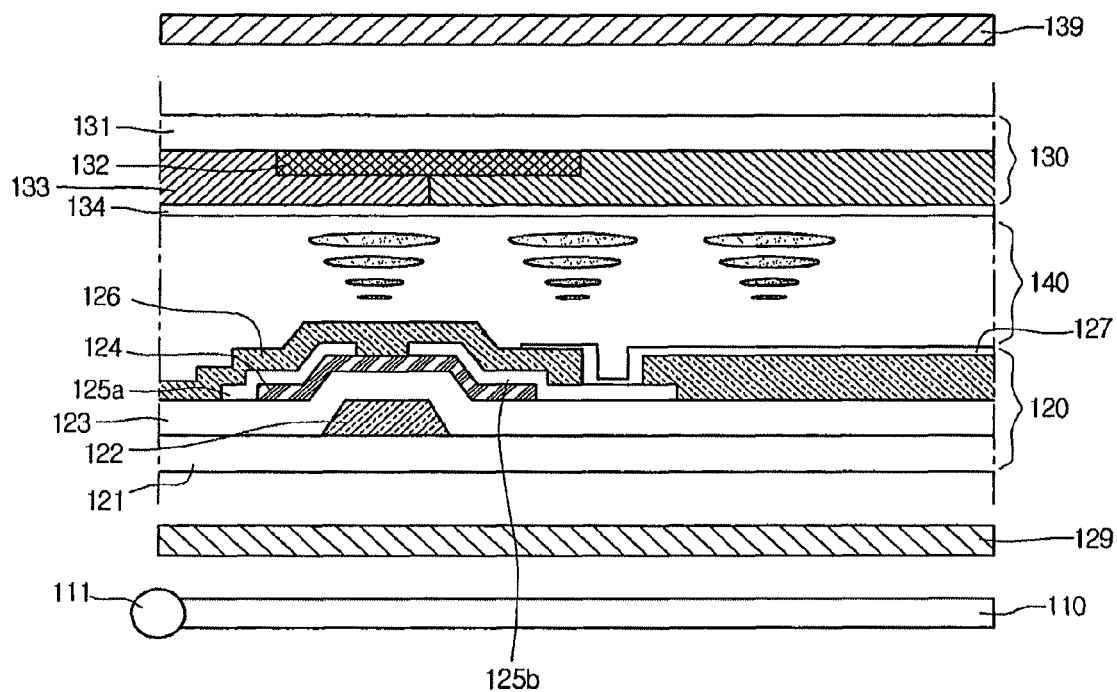
FIG. 1 is a schematic view illustrating a structure of a related art liquid crystal display device (LCD)
Figure 2:
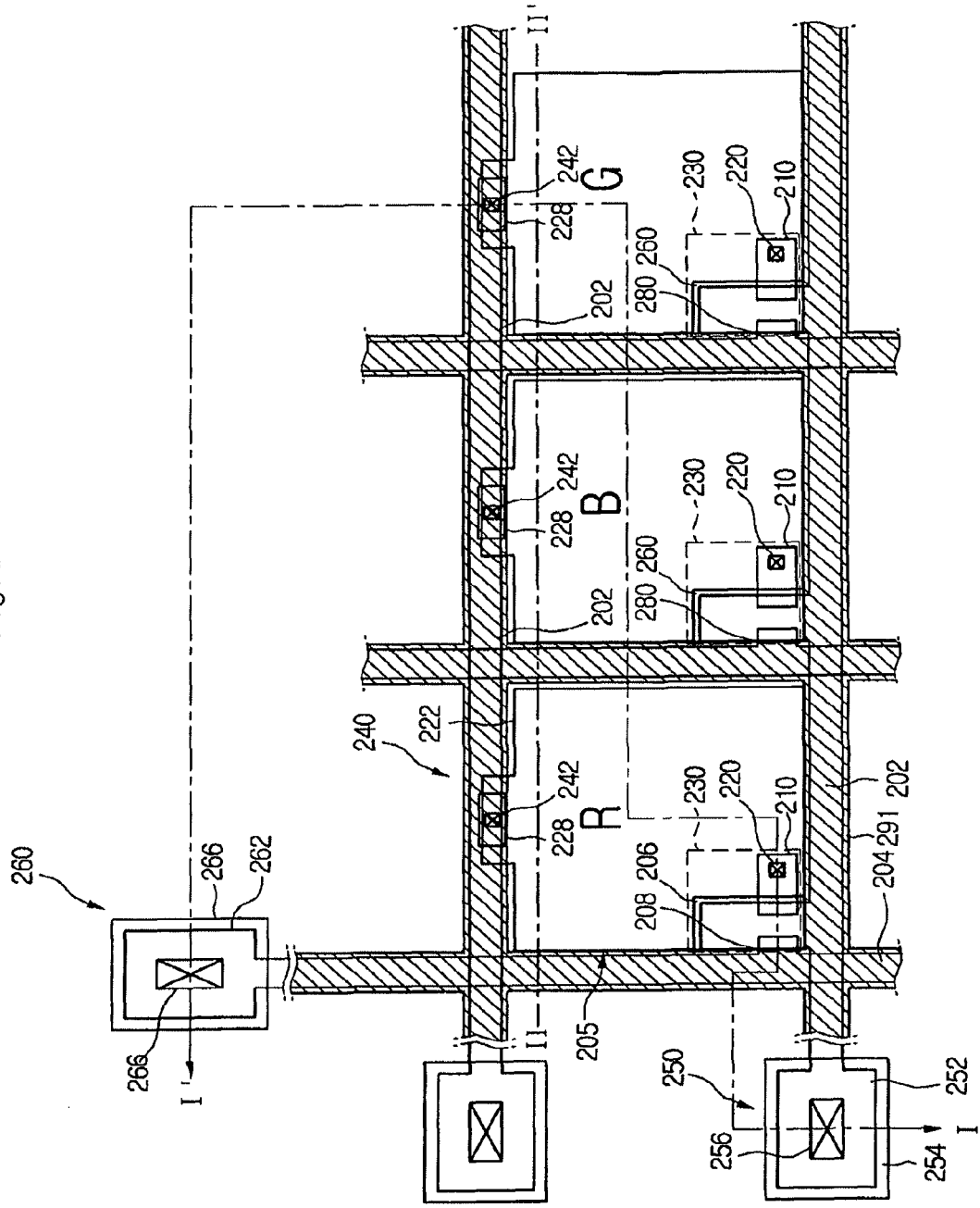
FIGS. 2 and 3 a plan view and a sectional view of an LCD according to a first embodiment of the present invention, respectively.
Figure 3:
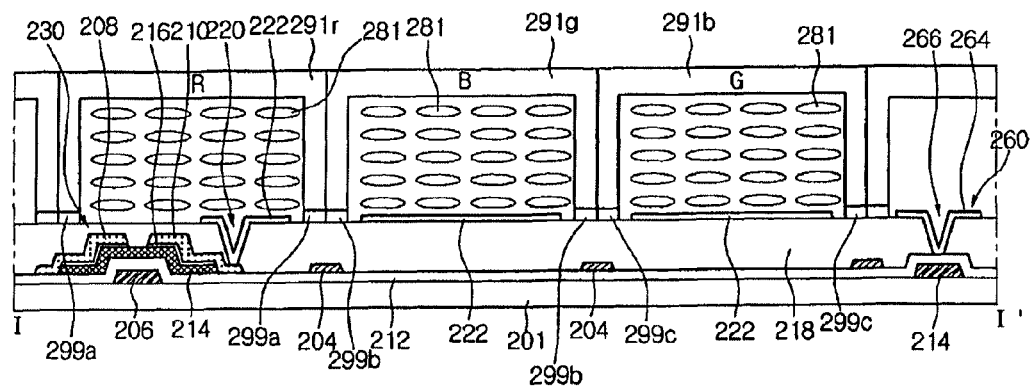

FIGS. 2 and 3 are a plan view and a sectional view of an LCD according to a first embodiment of the present invention, respectively. Referring to FIGS. 2 and 3, upon a lower substrate 201, there are formed a gate line 202, a data line 204, a thin film transistor (TFT) 230 formed at every intersection of the gate line 202 and the data line 204, a pixel electrode 222 formed at a pixel region provided by that intersection structure, a storage capacitor 240 formed at an overlap region of the gate line 202 and a storage electrode 228, a gate pad 250 connected to the gate line 202, and a data pad 260 connected to the data line 204. Herein, the gate line 202 intersects with the data line 204, while a gate insulating layer 212 is interposed therebetween.

The gate line 202 applies a gate signal and the data line 204 applies a data signal. The gate line 202 and the data line 204 are formed in a shape of an intersection structure, to thereby define a pixel region 205.

The TFT 230 maintains the charge of a pixel signal of the data line 204 at the pixel electrode 222 in response to a gate signal of the gate line 202. To this end, the TFT 230 is provided with a gate electrode 206 connected to the gate line 202, a source electrode 208 connected to the data line 204, and a drain electrode 210 connected to the pixel electrode.

In addition, the TFT 230 also contains an active layer 214 which forms a channel between the source electrode 208 and the drain electrode 210. The active layer 214 overlaps the underlying gate insulating layer 212 and the gate electrode 206. The active layer 214 also overlaps the data line 204, the data pad lower electrode 262 and the storage electrode 228. On the active layer 214, an ohmic contact layer 216 is additionally formed to provide good ohmic contact with the data line 204, the source electrode 208, the drain electrode 210, the data pad lower electrode 262, and the storage electrode 228.

The pixel electrode 222 is connected to the drain electrode 210 of the TFT 230 through a first contact hole 220 penetrating a protection layer 218 and the pixel electrode 222 is formed in the pixel region 205. As a result, an electric field is generated between a common electrode (not shown) to which a reference voltage is applied and the pixel electrode 222 to which the pixel signal is applied through the TFT 230.

In in-plane switching devices, the common electrode may be formed on the substrate 201 adjacent to the pixel electrode 222 and have a plurality of branches in the pixel region 205. In this case, a traverse electric field between the pixel electrode 222 and the common electrode is formed.

The storage capacitor 240 is provided with the gate line 202 and the storage electrode 228. The storage electrode 228 overlaps the underlying gate insulating layer 212 and the gate line 202. The storage electrode 228 is connected to the pixel electrode 222 through a second contact hole 242 which is formed in a protection layer 218 disposed on the TFT 230 and on which the pixel electrode 222 is formed. The storage capacitor 240 helps to maintain the pixel signal charged at the pixel electrode 222 until the next pixel signal is charged thereat.

The gate pad 250 is connected to a gate driver (not shown) so as to apply the gate signal to the gate line 202. The gate pad 250 is provided with a gate pad lower electrode 252 extended from the gate line 202, a gate pad upper electrode 254 connected to the gate pad lower electrode 252 through a third contact hole 256 penetrating the gate insulating layer 212 and the protection layer 218.

The data pad 260 is connected to a data driver (not shown) so as to apply the data signal to the data line 204. The data pad 260 is provided with a data pad lower electrode 262 extended from the data line 204, and the data pad upper electrode 264 connected to the data pad lower electrode 262 through a fourth contact hole 266 penetrating the protection layer 218.

Upon the lower substrate 201 of the LCD having the aforementioned structure, an alignment layer (not shown) is formed. An upper substrate 291 provides a color filter corresponding to every pixel region over the lower substrate 201 and a liquid crystal film is formed between the upper substrate 291 and the lower substrate 201.

The upper substrate 291 is provided with a red color filter substrate 291r, a green color filter substrate 291g, and a blue color filter substrate 291b. The upper substrate 291 is separated from the lower substrate 201 by a predetermined space, and is formed of high molecular polymer material. Partition walls 299 separate adjacent color filters 291r, 291g and 291b. The partition walls 299 may be formed in various structures such as a stripe, a square, a diamond, a triangle or the like.

Since the upper substrate 291 is formed by gradual growth over the lower substrate 201 using a photoreaction, it is possible to simultaneously form the upper substrate 291 and the liquid crystal film during the fabrication of the lower substrate 201. This decreases the amount of time to fabricate the LCD and increases the yield of the LCD as the LCD is fabricated without fabricating an additional substrate and then bonding the fabricated upper substrate together with the lower substrate. In addition, as the upper substrate and the lower substrate are integrated so that bonding is not used, which further improves the fabrication yield and reduces the cost as sealant for bonding is not used.

Moreover, in forming the upper substrate in the LCD according to the present invention, the partition walls are formed at boundaries of the pixel regions so that the partition walls act as spacers of the upper substrate. The partition walls of the LCD thus additionally maintain a uniform thickness of the liquid crystal panel without the use of additional spacers.

FIGS. 4A to 4H are sectional views illustrating a method for fabricating an LCD according to the first embodiment of the present invention. Herein, a description for the TFT will be omitted because it has been illustrated already. Thus, detail descriptions are focused on processes for forming the liquid crystal film and the upper substrate for each of red, green and blue pixels.

Figure 4A:
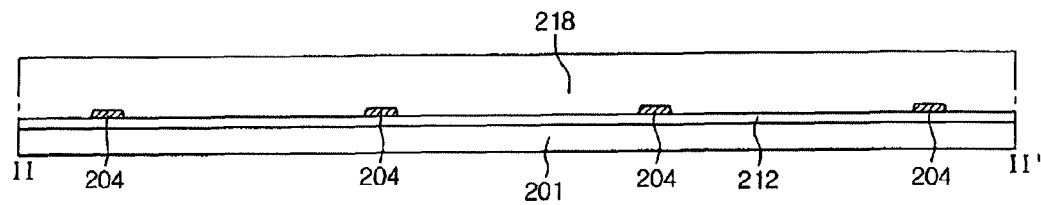
FIGS. 4A to 4H are sectional views illustrating a method for fabricating an LCD according to the first embodiment of the present invention.

Referring to FIG. 4A, the gate insulating layer 212 is formed on the lower substrate 201 and the data lines 204 for identifying the pixel region of red, green and blue are formed on the gate insulating layer 212. Thereafter, the protection layer 218 is formed on the data lines 204. The alignment layer may be formed on the protection layer 218.

Figure 4B:
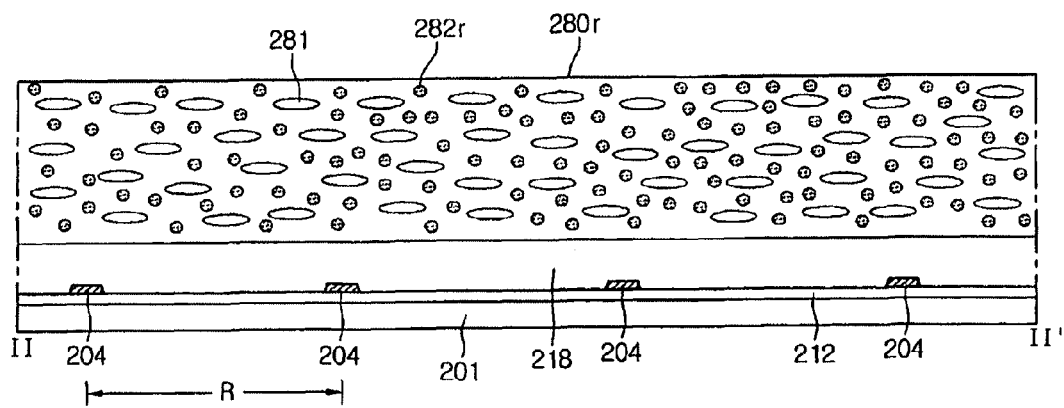

Referring to FIG. 4B, a red compound 280r is formed on the lower substrate 201. The red compound 280r contains a photopolymeric red color filter resin monomer 282r, a liquid crystal (LC) 281, and a binder monomer (not shown). The red color filter resin monomer 282r becomes polymerized when irradiated with ultraviolet (UV) light.

Figure 4C:
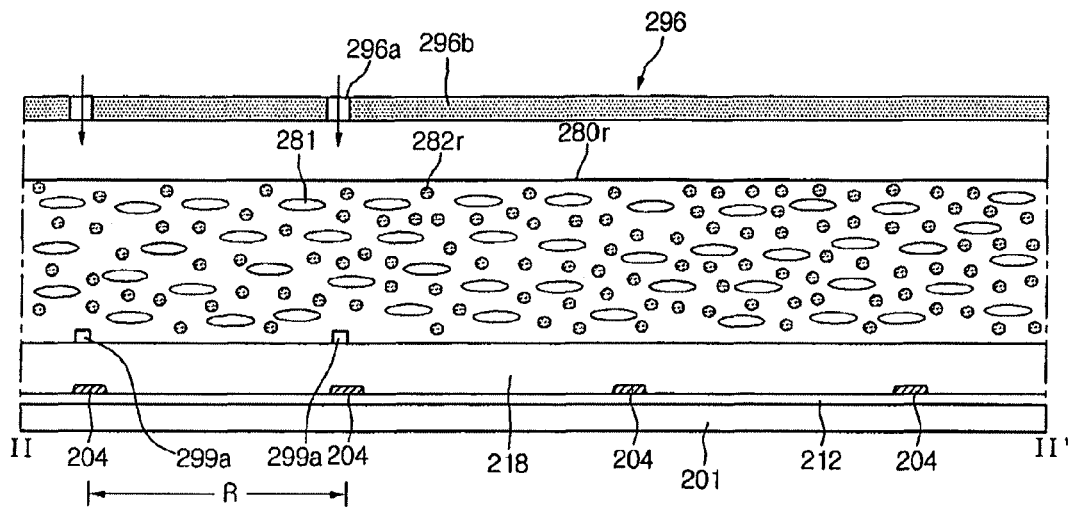

Thereafter, referring to FIG. 4C, after providing a mask 296 at a predetermined location over the lower substrate 201 where the red compound 280r is formed, boundaries of the red pixel region R are photo-exposed first. The mask 296 has a transmission part 296a and a blocking part 296b. The transmission part 296a is formed corresponding to the boundary of the red pixel region R on the lower substrate 201. Therefore, when UV light irradiates the mask 296, the UV light passing through the transmission part 296a polymerizes the underlying photopolymeric red color filter resin monomer 282r of the red compound 280r to thereby form a partition wall 299a which acts as a seed.

Figure 4D:
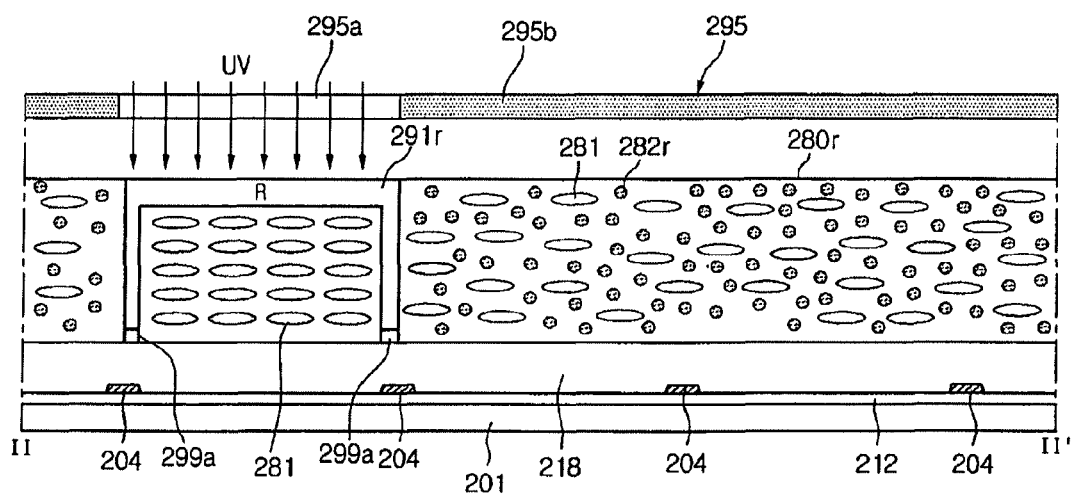
Figure 4E:
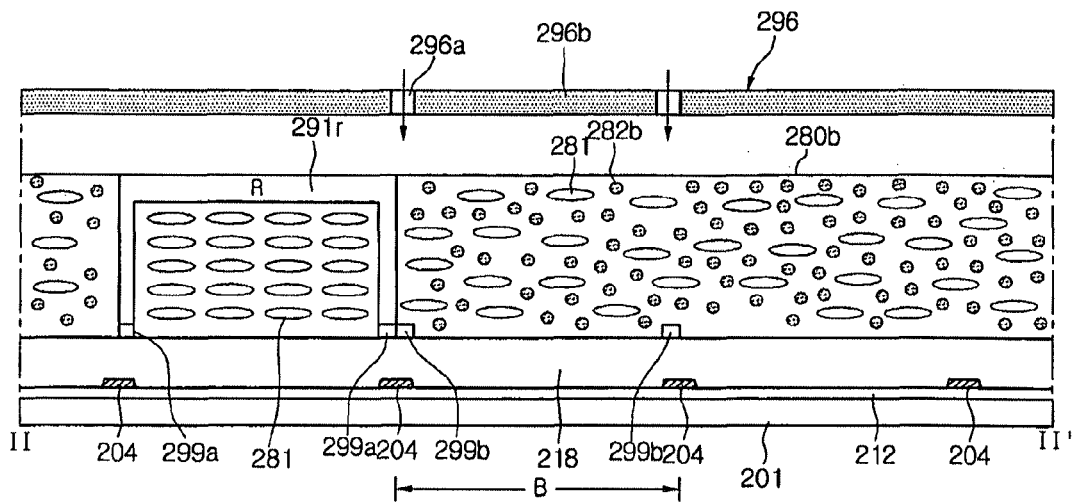

Referring to FIG. 4D, a mask 295 is provided at a predetermined location over the lower substrate 201 where the partition wall 299a is formed, and then the red pixel region R is photo-exposed. The mask 295 has a transmission part 295a and a blocking part 295b. The transmission part 295a is formed corresponding to the red pixel region R on the lower substrate 201. Accordingly, if the UV light irradiates the mask 295, the UV light passing through the transmission part 295a polymerizes the underlying photopolymeric red color filter resin monomer 282r of the red compound 280r that is formed on the red pixel region R.

Due to polymerization of the red color filter resin monomer 282r, the liquid crystal 281 and the polymer are separated from each other so that the red color filter resin monomer 282r and the binder monomer grow from the partition wall 299a, to thereby form the upper substrate and the red color filter substrate 291r acting as the red color filter. Thus, the liquid crystal 281 and the red color filter substrate 291r are formed on the red pixel region R of the lower substrate 201.

Afterwards, the red compound 280r formed on the blue and the green pixel regions B and G are removed. Subsequently, referring to FIG. 4E, a partition wall 299b, which serves as a seed, is formed at a boundary of the blue pixel region B over the lower substrate 201.

To this end, a blue compound 280b is formed on the lower substrate 201. The blue compound 280b contains a photopolymeric blue color filter resin monomer 282b, a liquid crystal (LC) 281, and a binder monomer (not shown). The blue color filter resin monomer 282b becomes polymerized when irradiated with UV light.

Thereafter, after providing a mask 296 at a predetermined location over the substrate 201 where the blue compound 280b is formed, a boundary of the blue pixel region B is photo-exposed first. The mask 296 has a transmission part 296a and a blocking part 296b. The transmission part 296a is formed corresponding to the boundary of the blue pixel region B on the lower substrate 201. Although the reference number of the above mask 296 is identical to that of the mask 296 used for forming the partition wall 299a of the red color filter substrate 291r, the same mask may be used by shifting the mask used for the red color filter substrate 291r or a different mask may be used. When UV light irradiates the mask 296, the UV light passing through the transmission part 296a polymerizes the photopolymeric blue color filter resin monomer 282b of the blue compound 280b to thereby form the partition wall 299b. The partition wall 299b, in turn, acts as the seed.

Figure 4F:
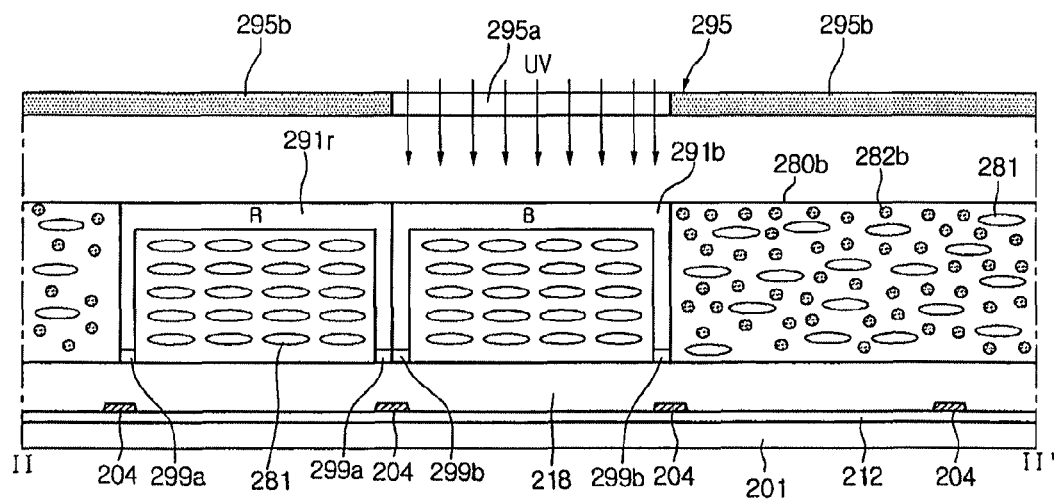

Referring to FIG. 4F, a mask 295 is positioned at a predetermined location over the substrate 201 where the partition wall 299B is formed, and then the blue pixel region B is photo-exposed. The mask 295 has a transmission part 295a and a blocking part 295b. The transmission part 295a is formed corresponding to the blue pixel region B on the lower substrate 201. Accordingly, if UV light irradiates the mask 295, the UV light passing through the transmission part 295a polymerizes the photo polymer blue color filter resin monomer 282b of the blue compound 280b that is formed on the blue pixel region B. Again, although the reference number of the above mask 295 is identical to that of the mask 295 used for forming the red color filter substrate 291r, the same mask may be used by shifting the mask for the red color filter substrate 291r by a predetermined distance or a different mask may be used.

Due to polymerization of the blue color filter resin monomer 282b, the liquid crystal 281 and the polymer are phase-separated from each other so that the blue color filter resin monomer 282b and the binder monomer grow from the partition wall 299b, to thereby form the blue color filter substrate 291b of the upper substrate. Therefore, the liquid crystal 281 and the blue color filter substrate 291b are formed on the blue pixel region B of the lower substrate 201. Afterwards, the blue compound 280b formed on the red and the green pixel regions R and G are removed.

Figure 4G:
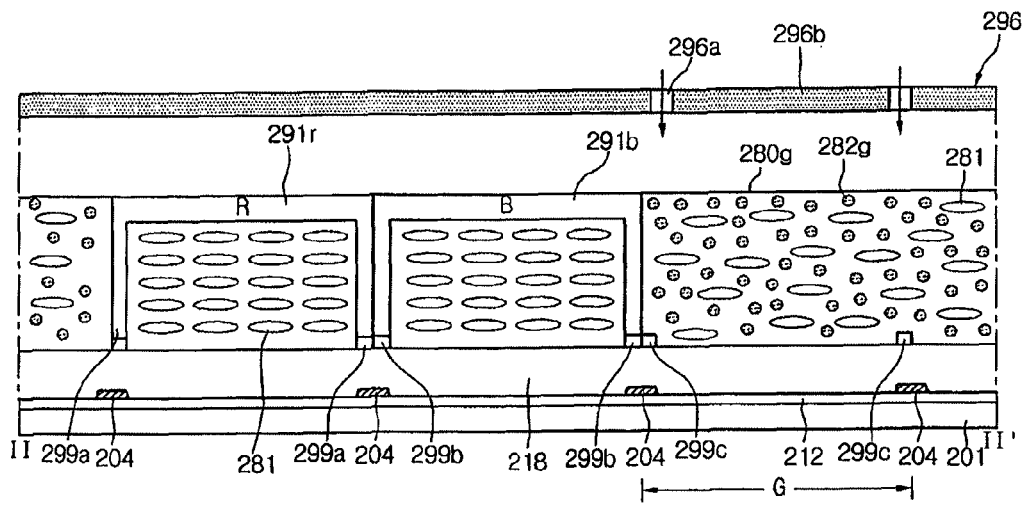

Referring to FIG. 4G, a partition wall 299g, which serves as a seed, is formed at a boundary of the green pixel region G over the lower substrate 201. To begin with, a green compound 280g is formed on the lower substrate 201. The green compound 280g contains a photopolymeric green color filter resin monomer 282g, a liquid crystal (LC) 281, and a binder monomer (not shown). The green color filter resin monomer 282g becomes polymerized when irradiated with UV light.

Thereafter, after providing a mask 296 at a predetermined location over the substrate 201 where the green compound 280g is formed, a boundary of the green pixel region G is photo-exposed first. The mask 296 has a transmission part 296a and a blocking part 296b. The transmission part 296a is formed corresponding to the boundary of the green pixel region G on the lower substrate 201. Although the reference number of the above mask 296 are identical to that of the mask 296 used for forming the partition walls 299a and 299b of the red and blue color filter substrates 291r and 291b, the same mask may be used by shifting the mask used for the red or the blue color filter substrate 291r and 291b by a predetermined distance or a different mask may be used. When the UV light irradiates the mask 296, the UV light passing through the transmission part 296a polymerizes the photo polymer green color filter resin monomer 282g of the green compound 280g to thereby form the partition wall 299g. The partition wall 299g acts as the seed.

Figure 4H:
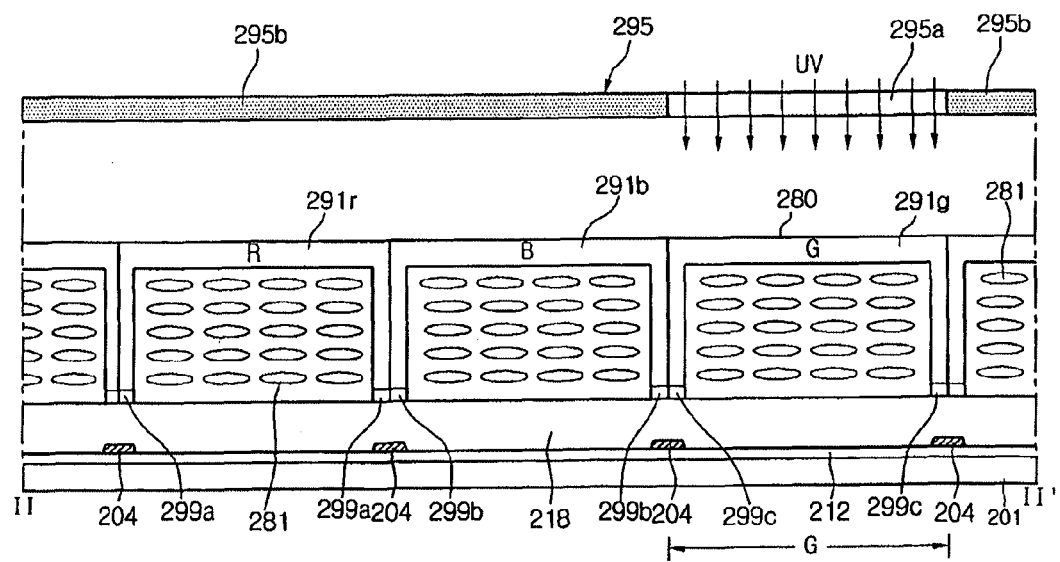

Referring to FIG. 4H, a mask 295 is provided at a predetermined location over the substrate 201 where the partition wall 299c is formed, and then the green pixel region G is photo-exposed. The mask 295 has a transmission part 295a and a blocking part 295b. The transmission part 295a is formed corresponding to the green pixel region G on the lower substrate 201. Although the reference number of the above mask 295 are identical to that of the mask 295 used for forming the red and the blue color filter substrates 291r and 291b, the same mask used for the red or the blue color filter substrate 291r and 291b may be used by shifting the mask by a predetermined distance or a different mask may be used.

When the UV light irradiates the mask 295, the UV light passing through the transmission part 295a of the mask 295 polymerizes the photopolymeric green color filter resin monomer 282g of the green compound 280g formed on the green pixel region G. Due to polymerization of the green color filter resin monomer 282g, the liquid crystal 281 and the polymer are phase-separated from each other so that the green color filter resin monomer 282g and the binder monomer grow from the partition wall 299g, to thereby form the green color filter substrate 291g of the upper substrate 291. Therefore, the liquid crystal 281 and the green color filter substrate 291b are formed on the green pixel region G of the lower substrate 201. Afterwards, the other green compound 280g is removed.

As described above, the upper substrate 291 is formed for each pixel region over the lower electrode 201 and the liquid crystal 281 is formed between the upper substrate 291 and the lower substrate 201. The upper substrate 291 is provided with the red color filter substrate 291r, the green color filter substrate 291g, and the blue color filter substrate 291b. There are partition walls 299 between two of the color filter substrates 291r, 291g and 291b in the upper substrate 291 so that one color filter substrate is separated from another.

Therefore, according to the present invention, since the upper substrate and the liquid crystal film are simultaneously formed on the lower substrate by phase separation during fabrication of the lower substrate of the LCD, the upper and the lower substrates of the liquid crystal panel can be integrated so that it is possible to enhance fabrication yield and simplify the fabrication process, and further increase expediency. Furthermore, the upper substrate and the lower substrate integrated so that bonding of the substrates and an additional fabrication process for the upper substrate may be avoided, which further improves the fabrication yield. In addition, use of a sealant for bonding the upper and the lower substrates may be avoided thereby reducing the fabrication cost. In forming the upper substrate in the LCD, the partition walls are formed at boundaries of the pixel regions so that the partition walls maintain a uniform thickness of the liquid crystal panel and uniform image.

FIGS. 5A to 5E are sectional views illustrating a method for fabricating an LCD according to a second embodiment of the present invention. Herein, like reference numerals in the drawings denote like elements so that detail descriptions for those elements, which are identical to the elements illustrated in FIGS. 4A to 4H, are omitted.

Figure 5A:
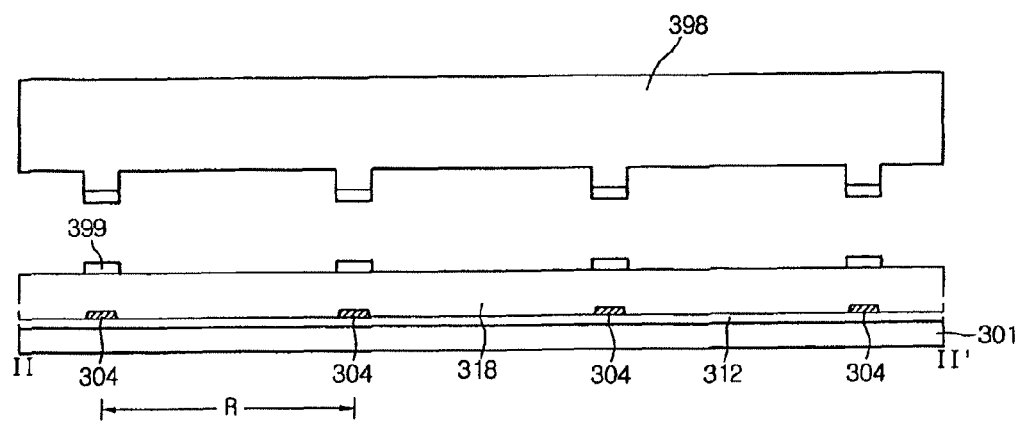
FIGS. 5A to 5E are sectional views illustrating a method for fabricating an LCD according to a second embodiment of the present invention.

To begin with, referring to FIG. 5A, a seed 399 is formed at boundaries of a red, a green and a blue pixel regions on a lower substrate 301. The seed 399 comprises a polymer material and is formed at the boundaries of the pixel regions of the lower substrate 301 by a method using a stamp 398 or a mold. The method for forming the seed 399 on the lower substrate 301 may employ a printing method using a silk screen, a transcription method of a pattern, or an imprinting method.

The seed 399 may be formed of a polymer material containing a black resin. The seed 399 may be formed in a black matrix pattern, i.e., region of a gate line, data line, a boundary of a pixel region, a TFT region and so forth so that it may be substituted for the black matrix.

Figure 5B:
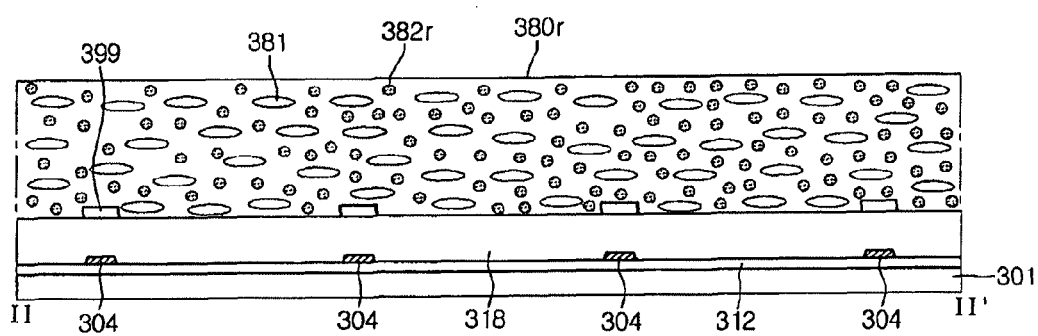

Thereafter, referring to FIG. 5B, a red compound 380r is formed on the lower substrate 301. The red compound 380r contains a photopolymeric red color filter resin monomer 382r, a liquid crystal (LC) 381, and a binder monomer (not shown).

Figure 5C:
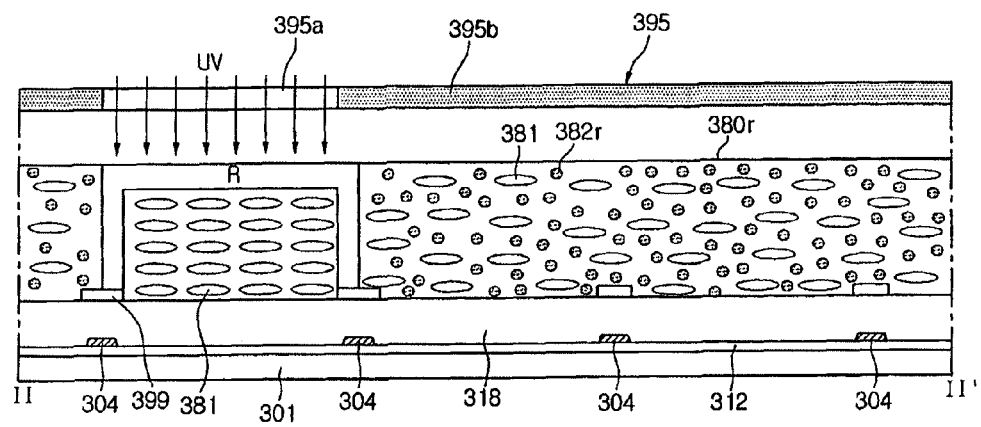

Thereafter, referring to FIG. 5C, after providing a mask 395 at a predetermined location over the substrate 301 where the seed 399 is formed, the red pixel region R is photo-exposed. The mask 395 has a transmission part 395a and a blocking part 395b. The transmission part 395a is formed corresponding to the red pixel region R on the lower substrate 301. When UV light irradiates the mask 395, the UV light passing through the transmission part 395a polymerizes the photopolymeric red color filter resin monomer 382r of the red compound 380r formed on the red pixel region R.

Due to polymerization of the red color filter resin monomer 382r, the liquid crystal and the polymer are phase-separated from each other so that the red color filter resin monomer 382r and the binder monomer grow from the seed 399, to thereby form the red color filter substrate 391r of the upper substrate 391. Therefore, the liquid crystal 381 and a red color filter substrate 391r are formed on the red pixel region R of the lower substrate 301. Afterwards, the red compound 380r formed on the blue and the green pixel regions B and G are removed.

Figure 5D:
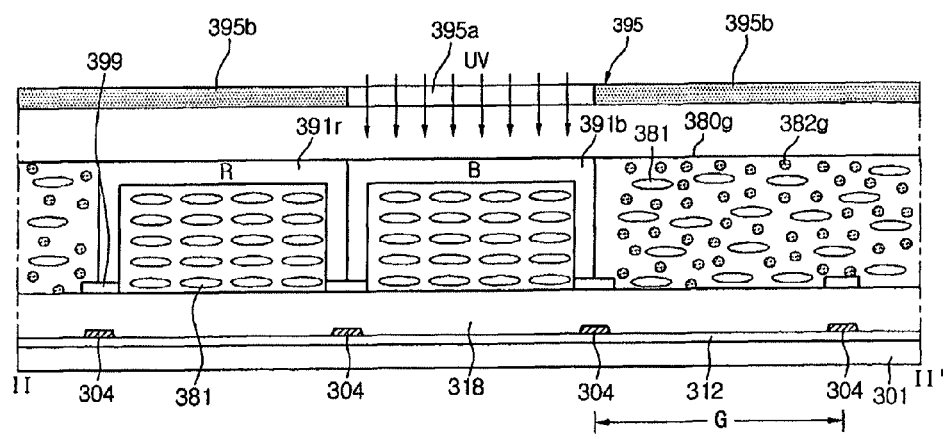

Referring to FIG. 5D, a blue compound 380b is formed on the lower substrate 301 and a mask 395 is disposed at a predetermined location over the lower substrate 301. Then, a photo-exposure is performed so as to form a blue color filter substrate 391b and the liquid crystal 381 on the blue pixel region by phase separation. Thereafter, the blue compound 380b formed on the other regions is removed.

Figure 5E:
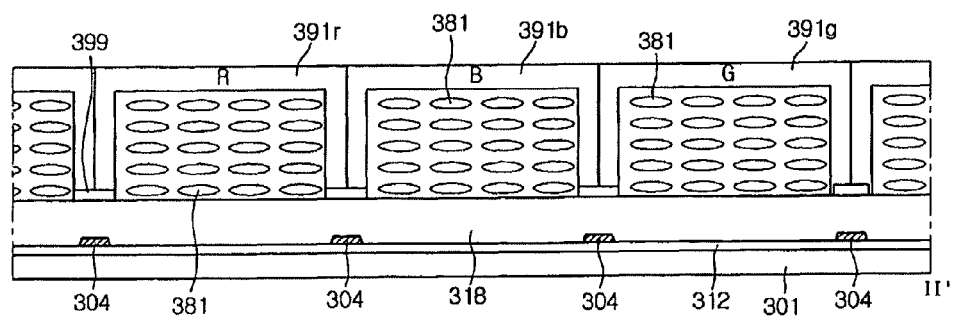

Subsequently, referring to FIG. 5E, a green compound 380g is formed on the lower substrate 301 and a mask 395 is formed at a predetermined location over the lower substrate 301. Then, a photo-exposure is performed so as to form a green color filter substrate 391g and the liquid crystal 381 on the green pixel region by the phase separation. Thereafter, the green compound 380g formed on the other regions is removed.

As described above, since it is possible to reduce the fabrication process by forming the seed 399 on the boundary of each pixel region at an initial stage of the fabrication process, the fabrication yield is improved. In addition, after the liquid crystal and the photopolymeric color filter resin are mixed and coated on the array substrate following the formation of the array substrate, the upper layer is formed coincidentally with the red, the green and the blue color filters by the phase separation. Therefore, this also enhances the fabrication yield, simplifies the fabrication process and reduces the fabrication cost.

In addition, the upper substrate is used as the color filter substrate without preparing an additional color filter layer, which decreases the thickness of the LCD. Also, in an LCD of the present invention incorporating a polarizer film or a compensation film, the upper substrate and one of the polarizer film and the compensation film may be integrated while the array substrate is formed, and then the liquid crystal film may also be formed using the phase separation.

Figure 6:
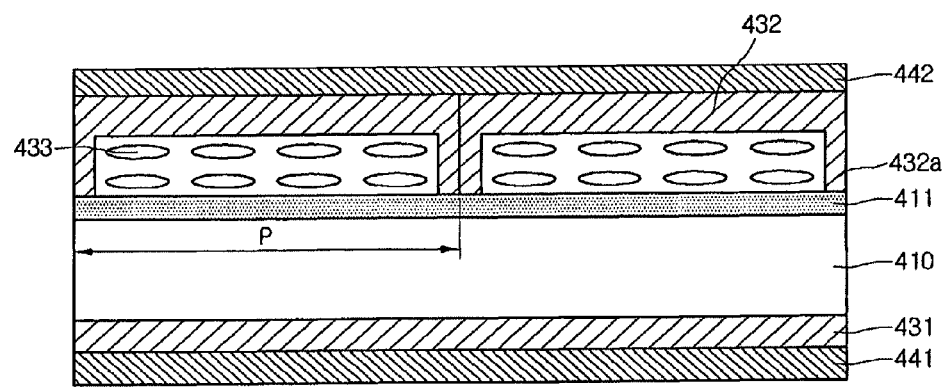
FIG. 6 is a sectional view illustrating a portion of an LCD according to a third embodiment of the present invention.

FIG. 6 is a sectional view illustrating a portion of an LCD according to a third embodiment of the present invention. In the LCD of the third embodiment of the present invention, an alignment layer 411 is formed on an array substrate 410 where an array device having a plurality of TFTs in a matrix shape is formed. Though the array device is formed between the array substrate 410 and the alignment layer 411, the drawing is not shown in detail.

Referring to FIG. 6, the alignment layer 411 is formed on the array substrate 410 and a reactive liquid crystal substrate 432 is formed at each pixel region on the array substrate 410. The liquid crystal film 433 is formed between the reactive liquid crystal substrate 432 and the array substrate 410.

The reactive liquid crystal substrate 432 is opposite to the array substrate 410 and is separated from the array substrate 410 by a predetermined space. The reactive liquid crystal substrate 432 contains a reactive mesogen 434 and a binder monomer (not shown) and acts as a retarder. The reactive liquid crystal substrate 432 for each pixel region is also separated from each other by means of a partition wall 432a.

Under the lower substrate 410, a lower polarizer film 441 is formed and an upper polarizer film 442 is formed on the reactive liquid crystal substrate 432. A lower retarder 431 is formed between the array substrate 410 and the lower polarizer film 442.

In addition, since the reactive liquid crystal substrate 432 is formed coincidentally with the liquid crystal film 433 on the array substrate 410 by virtue of the phase separation, the liquid crystal panel is completed while fabricating the array substrate 410. This improves the fabrication yield, simplifies the fabrication process and further increases expediency. Furthermore, since the lower array substrate 410 and the reactive liquid crystal substrate 432 are integrated, bonding, formation of the upper substrate, and formation of the retarder may be avoided. Therefore, the fabrication yield is further enhanced and the fabrication cost can be reduced because use of the sealant may be avoided.

The reactive liquid crystal substrate 432 may serve as a color filter by employing a color filter resin as well as the reactive mesogen 434 and the binder monomer (not shown). Dependent on various pixel structures of the red, green and blue pixels, it is possible to apply the partition wall 432a to various structures such as a stripe, a square, a diamond, a triangle structure or the like. The color filter may also be formed on the array substrate 410.

The reactive liquid crystal substrate acts as the retarder to compensate for a phase difference in the transmitted light. Since the reactive liquid crystal substrate may be formed at each pixel or be formed at a predetermined pixel group arbitrarily selected from the pixels, it is possible to compensate the phase difference for every pixel with different retardations or to control failure pixels generated at a specific location by means of the phase compensation.

In the reactive liquid crystal substrate of the LCD according to the present invention, the upper substrate is formed incorporating the partition walls therein at the boundaries of the pixel regions so that the partition walls maintain a uniform thickness of the liquid crystal panel and also keep the image of the LCD uniform.

Detail descriptions regarding a method for fabricating the liquid crystal panel having the above structure will be set forth hereinafter as illustrated in FIGS. 7A to 7E. FIGS. 7A to 7E are sectional views illustrating a method for fabricating the LCD according to a third embodiment of the present invention. Herein, an explanation for the fabrication of the TFT is omitted but detail illustrations focus on processes of forming a liquid crystal film and a reactive liquid crystal substrate.

Though it is not shown in the drawings, gate and data interconnections are formed on an array substrate, while the gate and data lines intersect each other. In addition, the LCD contains a TFT provided with a gate electrode extended from the gate interconnection, a gate insulating layer formed over entire the structure having the gate electrode, a semiconductor layer formed on the gate insulating layer, and source/drain electrodes formed on the semiconductor layer. A pixel electrode is connected to the drain electrode of the TFT through a contact hole formed in a protection layer.

An electric field is generated between the pixel electrode to which the pixel signal is applied through the TFT and the common electrode to which the reference voltage is applied. In an in-plane mode device, the common electrode may have a plurality of branches interdigitated with the pixel electrode in the pixel region. In this case, a traverse electric field is formed between the pixel electrode and the common electrode. Transmissivity of the light transmitted through the pixel region varies with the degree of rotation of the liquid crystal molecules, to thereby provide a gradation. Moreover, a fringe field between the pixel electrode and the common electrode drives the liquid crystal since the common electrode is formed under the pixel electrode on the lower substrate and the pixel electrode has a plurality of branches.

Figure 7A:
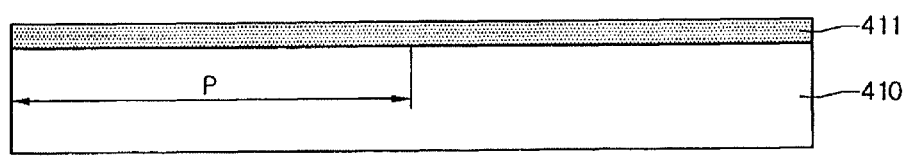
FIGS. 7A to 7E are sectional views illustrating a method for fabricating an LCD according to the third embodiment of the present invention.

Referring to FIG. 7A, an alignment layer 411 is formed wholly on the substrate in which a predetermined structure described above has been completed.

Figure 7B:
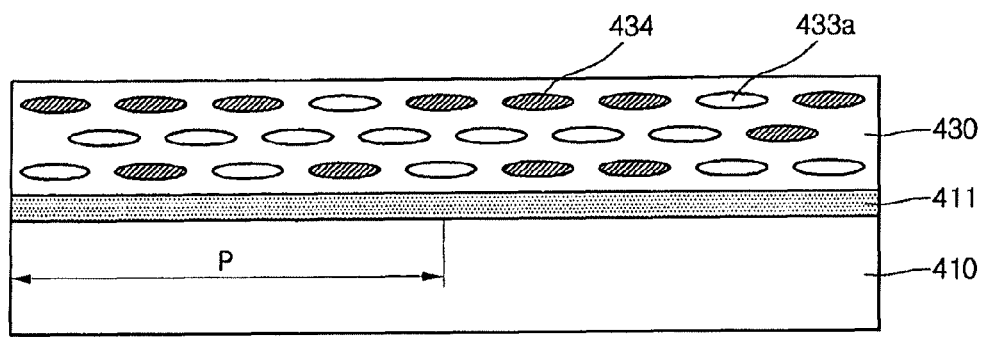

As illustrated in FIG. 7B, a liquid crystal compound 430 is coated on the array substrate 410. The liquid crystal compound 430 contains a UV curable reactive mesogen 434, a binder monomer (not shown) and a liquid crystal 433a. The reactive mesogen 434 is polymerized when irradiated with UV light to form a reactive liquid crystal substrate 432 which serves as an upper substrate with the binder monomer.

Figure 7C:
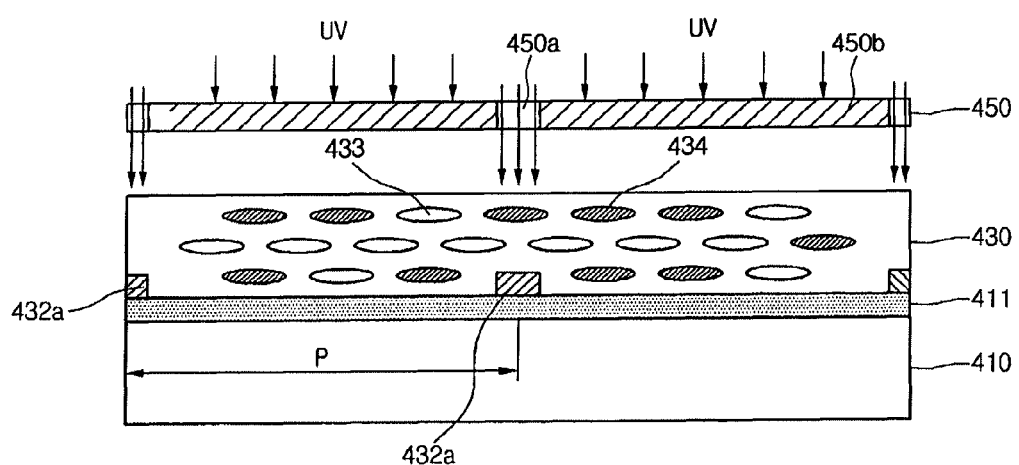

Thereafter, referring to FIG. 7C, after providing a mask 450 at a predetermined location over the substrate 410, a boundary of the pixel region P is photo-exposed first. The mask 450 has a transmission part 450a and a blocking part 450b, wherein the transmission part 450a is formed corresponding to the boundary of the pixel region P on the lower substrate 410. When the UV light irradiates the mask 450, the UV light passing through the transmission part 450a polymerizes the reactive mesogen 434 and the binder monomer of the liquid crystal compound 430 to thereby form a partition wall 432a of a polymer. The partition wall 432a acts as a seed.

Dependent on the pixel structures of the red, green and blue pixels, it is possible to apply the partition wall 432a to various structures such as a stripe, a square, a diamond, a triangle structure or the like. The partition wall 432a may be formed by a seed at the boundary of the pixel region disposed on the array substrate 410. To this end, the polymer seed 399 is formed at the boundaries of the pixel regions disposed on the lower substrate 410 by a method using a stamp or a mold. The method for forming the seed on the lower substrate may employ a printing method using a silk screen, a transcription method of a pattern, or an imprinting method. The seed may be formed of a polymer material incorporating a black resin. The seed may be formed in a black matrix pattern, i.e., region of a gate line, data line, a boundary of a pixel region, a TFT region and so forth so that it may substitute for the black matrix.

Figure 7D:
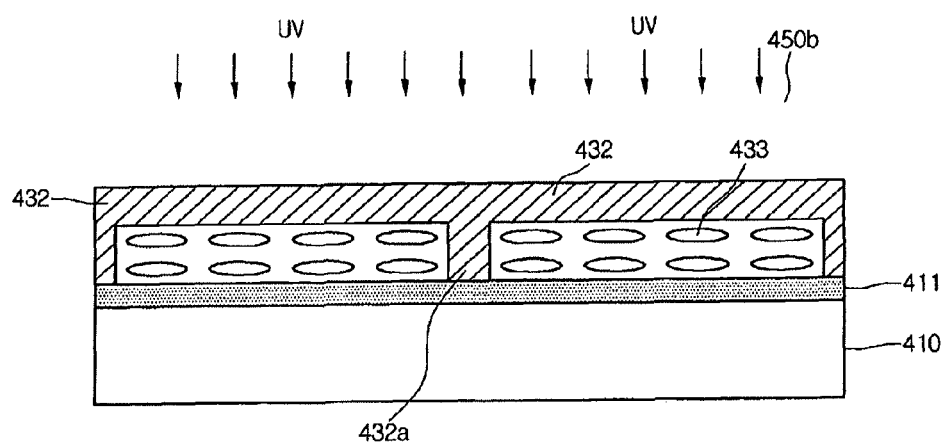

Afterwards, referring to FIG. 7D, the UV light irradiates the array substrate 410 where the partition wall 432a is formed. Since the UV light polymerizes the reactive mesogen 434 and the binder monomer of the liquid crystal compound 430, the polymer gradually grows from the partition wall 432a and is phase-separated from the liquid crystal 433a, so as to form the reactive liquid crystal substrate 432. That is, due to polymerizing of the reactive mesogen 434 and the binder monomer by means of the photopolymerization, the liquid crystal 433a and the polymer are phase-separated from each other so that the reactive liquid crystal substrate 432 of the upper substrate is formed from the partition wall 432a. Accordingly, the liquid crystal film 433 and the reactive liquid crystal substrate 432 are formed wholly on the array substrate 410.

The reactive liquid crystal substrate 432 serves as a retarder. Provided that the reactive liquid crystal substrate 432 has d in thickness, a retardation becomes Δnd, where Δn denotes a birefringence index of the reactive mesogen.

Figure 7E:
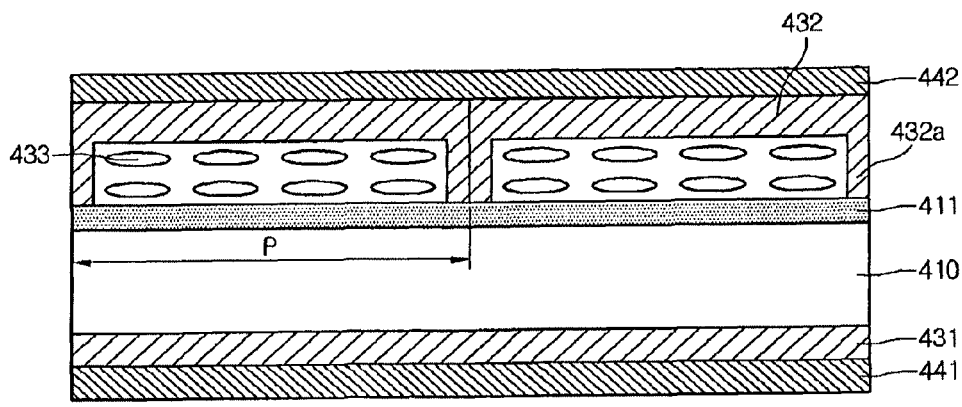

Referring to FIG. 7E, an upper polarizer film 442 is formed on the reactive liquid crystal substrate 432 and a lower polarizer film 441 is formed below the array substrate 410 to complete the liquid crystal panel. Since the reactive liquid crystal substrate 432 serving as the retarder is coincidentally formed with the liquid crystal film 433 during fabrication of the array substrate of the liquid crystal panel through phase separation, the upper and the lower substrates are integrated. As a result, the fabrication yield increases, the fabrication process is simplified and expediency is increased.

In addition, the reactive liquid crystal substrate 432 may act as a color filter by incorporating therein a color filter resin as well as the reactive mesogen 434 and the binder monomer (not shown). Dependent on the various pixel structures of the red, green and blue pixels, it is possible to apply the partition wall 432a to various structures such as a stripe, a square, a diamond, a triangle structure or the like. The color filter may be formed on the array substrate.

According to the present invention, since the reactive liquid crystal substrate 432 and the liquid crystal film 433 are simultaneously formed on the lower substrate 410 by phase separation during fabrication of the lower substrate of the LCD, the liquid crystal panel can be completed while fabricating the array substrate 410. This enhances fabrication yield and simplifies the fabrication process. Moreover, in forming the upper substrate in the LCD according to the present invention, the partition walls are formed at boundaries of the pixel regions so that the partition walls act as spacers of the upper substrate. In addition, because the upper substrate and the retarder are formed at the same time, use of an additional retarder may be avoided, decreasing the thickness of the LCD. In addition, the reactive liquid crystal substrate acts as a retarder to compensate for the phase difference. Because the reactive liquid crystal substrate may be formed at each pixel or be formed at a predetermined pixel group arbitrarily selected from the pixels, it is possible to compensate the phase difference for every pixel with different retardations or to control failure pixels generated at a specific location by means of the phase compensation.

Figure 8:
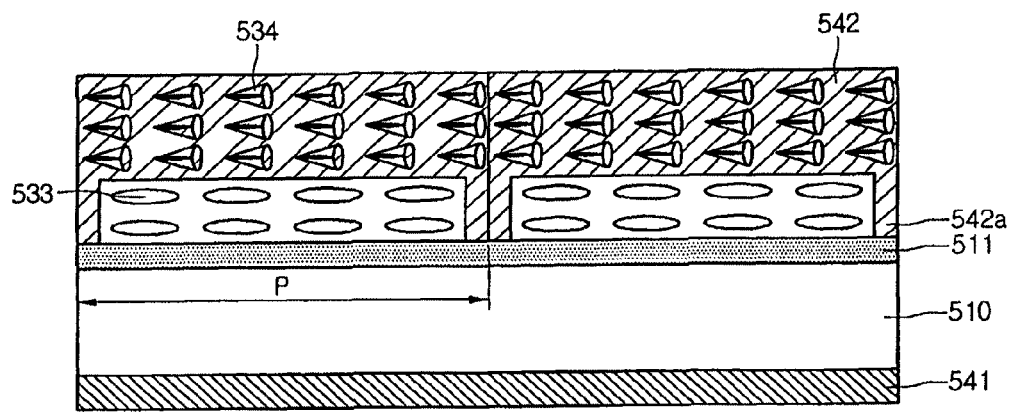
FIG. 8 is a sectional view of an LCD according to a fourth embodiment of the present invention.

FIG. 8 is a sectional view illustrating a portion of an LCD according to a fourth embodiment of the present invention. As described already, an array device where TFTs are formed in a shape of a matrix is configured on an array substrate 510. An alignment layer is formed on the array substrate 510.

Referring to FIG. 8, a polarizer substrate 542 is formed for each pixel region on the array substrate 510 and a liquid crystal film 533 is formed between the polarizer substrate 542 and the array substrate 510. The polarizer substrate 542 is opposite to the array substrate 510 and is separated from the array substrate 510 by a predetermined space.

The polarizer substrate 542 contains a reactive mesogen 534 and a binder monomer (not shown). The reactive mesogen 534 is a smetic liquid crystal monomer. In particular, it is preferable to use a smetic-A phase liquid crystal.

The polarizer substrate 542 has a separation structure that it is separated by means of the partition wall 542a in every pixel region. Dependent on the various pixel structures of the red, green and blue pixels, it is possible to apply the partition wall 542a to various structures such as a stripe, a square, a diamond, a triangle structure or the like.

The polarizer substrate 542 serves as a polarizer film as well as the upper substrate. In addition, because the polarizer substrate 542 and the liquid crystal film 533 are simultaneously formed on the array substrate 510 by phase separation during fabrication of the lower substrate of the LCD, the liquid crystal panel can be completed while fabricating the array substrate 510. This enhances fabrication yield and simplifies the fabrication process.

Moreover, the polarizer substrate 542 of the liquid panel has the partition walls therein which are formed at boundaries of the pixel regions so as to form the upper substrate so that the partition walls act as spacers of the upper substrate. In addition, because the upper substrate and the polarizer substrate are formed at the same time in the liquid crystal panel, use of an additional polarizer film may be avoided, decreasing the thickness of the LCD.

Detail descriptions regarding a method for fabricating the liquid crystal panel having the above structure will be set forth hereinafter as illustrated in FIGS. 9A to 9E. FIGS. 9A to 9E are sectional views illustrating a method for fabricating the LCD according to a fourth embodiment of the present invention. Herein, an explanation for the fabrication of the TFT is omitted but detail illustrations focus on processes of forming a liquid crystal film and an upper polarizer substrate.

Figure 9A:
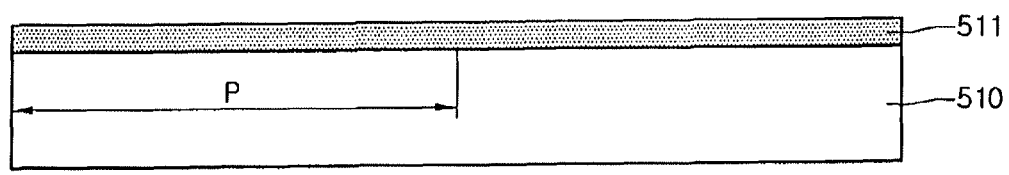
FIGS. 9A to 9E are sectional views illustrating a method for fabricating an LCD according to the fourth embodiment of the present invention.

To begin with, referring to FIG. 9A, an alignment layer 511 is formed on an array substrate 510.

Figure 9B:
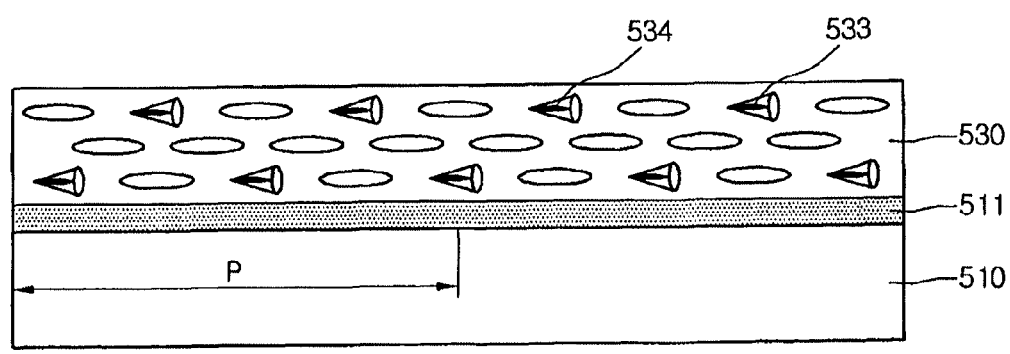

Referring to FIG. 9B, a liquid crystal compound 530 is coated on the array substrate 510. The liquid crystal compound 530 contains a reactive mesogen 534, a binder monomer and a liquid crystal 533.

The reactive mesogen 534 is formed of a smetic liquid crystal. The reactive mesogen 534 is polymerized when irradiated with UV light to form the polarizer substrate 542 serving as the upper substrate with the binder monomer.

The liquid crystal compound 530 contains a black dye. The liquid crystal 533 and the black dye are aligned by virtue of the alignment layer 511.

Figure 9C:
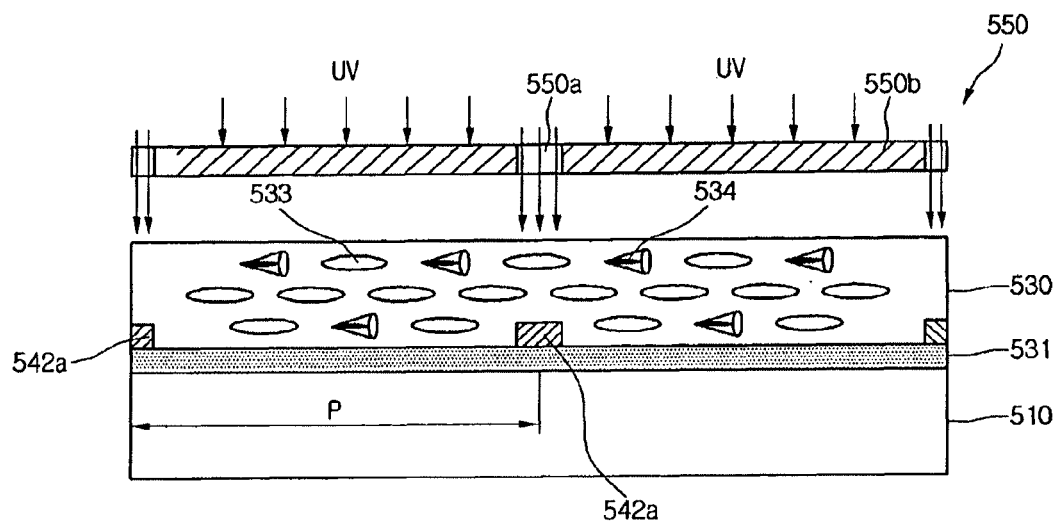

Thereafter, referring to FIG. 9C, after providing a mask 550 at a predetermined location over the array substrate 510, a boundary of the pixel region is photo-exposed first. The mask 550 has a transmission part 550a and a blocking part 550b. The transmission part 550a is formed corresponding to the boundary of the pixel region on the array substrate 510. When UV light irradiates the mask 550, the UV light passing through the transmission part 550a polymerizes the reactive mesogen 534 and the binder monomer of the liquid crystal compound 530 through photopolymerization to thereby form a partition wall 542a. The partition wall 542a acts as a seed.

Dependent on the various pixel structures of the red, green and blue pixels, it is possible to apply the partition wall 542a to various structures such as a stripe, a square, a diamond, a triangle structure or the like. The partition wall 542a may be formed by a seed at the boundary of the pixel region disposed on the array substrate 510. To this end, the seed of a polymer material is formed at the boundaries of the pixel regions disposed on the array substrate 510 by a method using a stamp or a mold. The method for forming the seed on the lower substrate may employ a printing method using a silk screen, a transcription method of a pattern, or an imprinting method.

The seed may be formed of a polymer material containing a black resin. The seed may be formed in a black matrix pattern, i.e., region of a gate line, data line, a boundary of a pixel region, a TFT region and so forth so that it may be substituted for the black matrix.

Figure 9D:
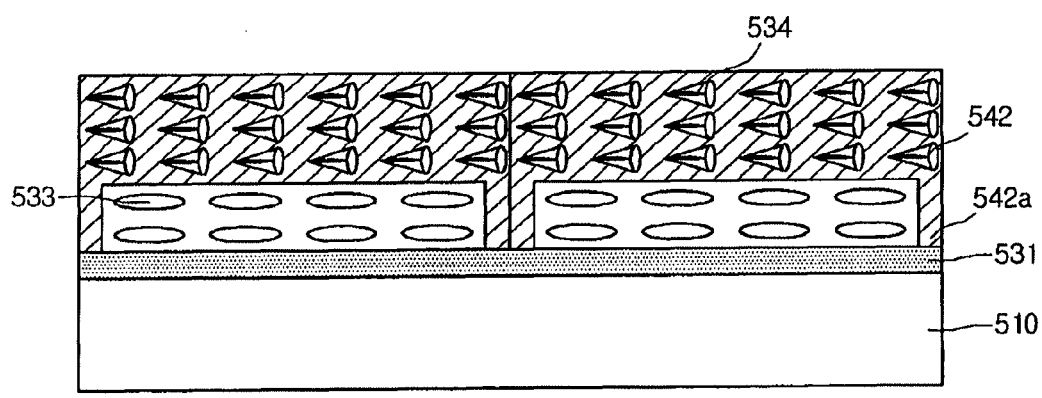

Afterwards, referring to FIG. 9D, the UV light irradiates the array substrate 510 where the partition wall 542a is formed. The UV light polymerizes the reactive mesogen 534 and the binder monomer of the liquid crystal compound 530 so that the polymer grows from the partition wall 542a and is phase-separated from the liquid crystal 533, thereby forming a polarizer substrate 542.

That is, due to polymerizing of the reactive mesogen 534 and the binder monomer by means of photopolymerization, the liquid crystal 533 and the polymer are phase-separated from each other so that the polarizer substrate 542 are formed from the partition wall 542a, which serves as a polarizer film as well as the upper substrate.

The polarizer substrate 542 forms absorption gratings for the polarized light by structuring smetic liquid crystals, e.g., smetic A-phase liquid crystals, in a shape of a bookshelf. Therefore, by virtue of the polymerization, the polarizer substrate 542, in which the upper substrate and the upper polarizer film are integrated, is formed coincidentally with the liquid crystal film 530 through the phase separation. Since it is possible to form the polarizer substrate 542 with a sufficient thickness, it is possible to secure an optical density (OD). The liquid crystal film 530 and the polarizer substrate 542 are wholly formed on the array substrate 510.

Figure 9E:
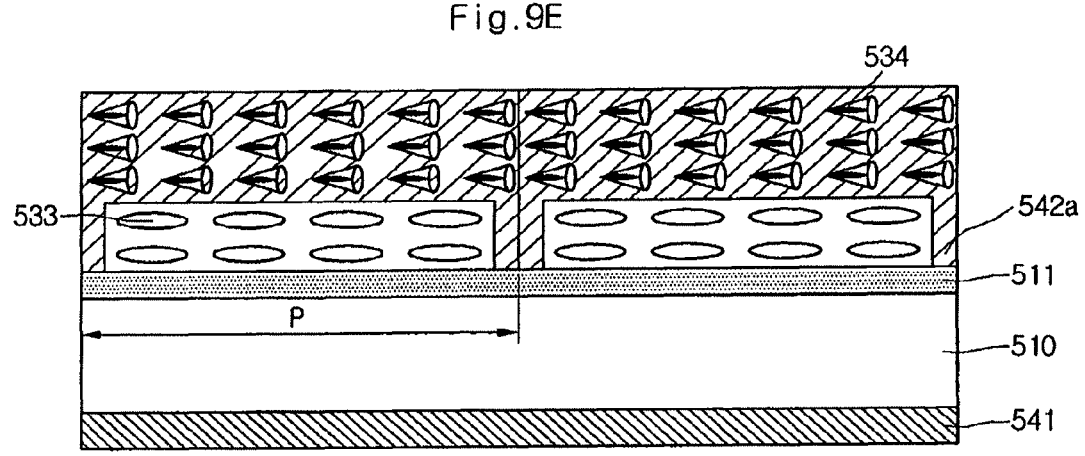

Referring to FIG. 9E, a lower polarizer film 541 is formed under the array substrate 510. Since the polarizer substrate and the liquid crystal film are simultaneously formed on the lower substrate by phase separation during fabrication of the lower substrate of the LCD, the liquid crystal panel can be completed while fabricating the array substrate so that it is possible to enhance a fabrication yield and simplify the fabrication process.

In addition, because there is polarization effect at the polarizer substrate in the liquid crystal panel, use of an additional polarizer film may be avoided, thereby decreasing the thickness of the LCD. Since the polarizer substrate serving as a polarizer plate is coincidentally formed with the liquid crystal film during fabrication of the array substrate of the liquid crystal panel through the phase separation, the upper and the lower substrates integrated. As a result, the fabrication yield increases and the fabrication process simplified.

In the reactive liquid crystal substrate and the polarizer substrate of the LCD according to the present invention, the partition wall is formed at the boundary of the pixel region in forming the upper substrate so that the partition wall maintains a uniform thickness of the liquid crystal panel and also keeps a uniform image of the LCD. In addition, since the upper substrate is formed coincidentally with the polarizer substrate in the liquid crystal panel according to the present invention, use of an additional polarizer film may be avoided, decreasing the thickness of the LCD.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for fabricating an LCD, comprising:
   a) forming an array device on each of red, green and blue color pixel regions of a lower substrate;
   b) providing a compound containing a liquid crystal and a photopolymeric color polymer on each of the red, green and blue color pixel regions of the lower substrate;
   c) photo-exposing the photopolymeric color polymer to form a seed at the boundary of each of the red, green and blue color pixel regions on the lower substrate, the seed formed by polymerizing the photopolymeric color polymer; and
   d) photo-exposing the photopolymeric color polymer on each of the red, the green and the blue color pixel regions to form an upper substrate having a color polymer, the color polymer phase-separated from the liquid crystal,
   wherein the upper substrate has a first portion extending from the seed toward a first direction and a second portion extending from the first portion toward a second direction different from the first direction, and
   wherein side surfaces of adjacent first portions contact each other.

2. The method according to claim 1, wherein the color polymer includes a red, a green and a blue color filter resin monomers and a binder monomer.

3. The method according to claim 1, wherein the upper substrate is partitioned at every pixel region.

4. The method according to claim 1, wherein the liquid crystal in each of the pixel regions is separated by the upper substrate.

5. The method according to claim 1, wherein the upper substrate has a predetermined structure selected from the group consisting of a stripe structure, a diamond structure, a square structure and a triangle structure.

6. The method according to claim 1, wherein adjacent seeds contact each other.

7. The method according to claim 1, wherein b) and d) are sequentially carried out for the red, the green and the blue color pixel regions.

8. The method according to claim 1, wherein the upper substrate in the red, the green and the blue color pixel regions is formed sequentially.

9. The method according to claim 1, wherein the seed is formed at boundaries having a plurality of the same-colored pixel regions.

10. The method according to claim 1, wherein the seed has a predetermined structure selected from the group consisting of a stripe structure, a diamond structure, a square structure and a triangle structure.

11. The method according to claim 1, wherein the color polymer of the upper substrate is grown from the seed.

12. The method according to claim 1, wherein the seed and the upper substrate are integral.

13. The method according to claim 1, wherein the upper substrate and the seed are formed of a same material.

14. The method according to claim 1, wherein the upper substrate surrounds the liquid crystal.

15. A method for fabricating an LCD, comprising:
a) forming an array device on each of red, green and blue color pixel regions of a lower substrate;
b) providing a compound containing a liquid crystal and a photopolymeric color polymer on each of the red, green and blue color pixel regions of the lower substrate;
c) photo-exposing the photopolymeric color polymer to form a seed at the boundary of one of the red, green and blue color pixel regions on the lower substrate;
d) photo-exposing the photopolymeric color polymer on the one of the red, the green and the blue color pixel regions to form an upper substrate having a color polymer, the color polymer phase-separated from the liquid crystal;
e) removing the remaining compound in the other ones of the red, the green and the blue color pixel regions; and
f) repeating b) through e) until the upper substrate is sequentially formed on all of the red, green and blue color pixel regions.

* * * * *